(12) United States Patent
Sakamaki et al.

(10) Patent No.: US 6,843,485 B2
(45) Date of Patent: Jan. 18, 2005

(54) CHUCK DEVICE

(75) Inventors: Kazuo Sakamaki, Ojiya (JP); Akira Sakamaki, Ojiya (JP); Chokichi Sato, Ojiya (JP); Tadashi Taniguchi, Ojiya (JP)

(73) Assignee: Yukiwa Seiko Kabushiki Kaisha, Nigata-Ken (JP)

( * ) Notice: Subject to any disclaimer, the term of this patent is extended or adjusted under 35 U.S.C. 154(b) by 255 days.

(21) Appl. No.: 10/211,532

(22) Filed: Aug. 5, 2002

(65) Prior Publication Data

US 2003/0137113 A1 Jul. 24, 2003

(30) Foreign Application Priority Data

Jan. 18, 2002 (JP) ........................................ 2002-010552

(51) Int. Cl.⁷ .............................................. B23B 31/12
(52) U.S. Cl. ........................ 279/62; 279/140; 279/902
(58) Field of Search ............................. 279/60, 61, 62, 279/140, 157, 902

(56) References Cited

U.S. PATENT DOCUMENTS

| | | |
|---|---|---|
| 3,237,955 A | 3/1966 | McCarthy et al. |
| 5,322,303 A | 6/1994 | Nakamura |
| 5,458,345 A | 10/1995 | Amyot |
| 5,716,057 A | 2/1998 | Wright, Jr. et al. |
| 5,765,839 A | 6/1998 | Rohm |
| 5,829,761 A | 11/1998 | Rohm |
| 6,095,530 A | 8/2000 | Rohm |
| 6,129,363 A | 10/2000 | Mack |
| 6,517,088 B1 * | 2/2003 | Rohm .......................... 279/62 |
| 6,572,119 B2 | 6/2003 | Selb |
| 6,581,942 B2 * | 6/2003 | Rohm .......................... 279/62 |
| 2003/0141676 A1 | 7/2003 | Sakamaki et al. |

FOREIGN PATENT DOCUMENTS

| | | |
|---|---|---|
| DE | 4438991 | 10/1994 |
| EP | 0710518 | 1/2001 |
| FR | 27202975 | 3/1993 |

* cited by examiner

*Primary Examiner*—Daniel W. Howell
(74) *Attorney, Agent, or Firm*—Sughrue Mion, PLLC

(57) ABSTRACT

A chuck device in which a plurality of claws provided at an end of a body are opened, closed and slid by the rotation of a rotary sleeve and a tool is clamped by means of the claws. An annular ratchet wheel is provided on the body. An annular nut member to be engaged with the claws and to be rotated together with the rotary sleeve is fitted in the body inside of the rotary sleeve. A retainer spring member detachably retained with a tooth of the ratchet wheel is arranged outside of the ratchet wheel, the retainer spring member is arranged to rotate around the ratchet wheel in accordance with the rotation of the nut member, the retainer spring member is mounted on the nut member by convex/concave engagement means. A retainer portion keeps a condition that the ratchet wheel and the retainer spring member are retained to each other and a condition that the engagement between the ratchet wheel and the retainer spring member is released, and the retainer portion is disposed between the body and the rotary sleeve and defined by the retainer spring member and an inner surface of the rotary member.

8 Claims, 9 Drawing Sheets

CHUCK DEVICE

BACKGROUND OF THE INVENTION

The present invention relates to a chuck device for clamping a tool.

Conventionally, a chuck device for clamping a tool has been proposed.

The chuck device is additionally provided to an electric power rotary device. A desired tool such as a drill is clamped by means of the chuck device for performing boring work or the like.

By the way, there are electric power rotary tool such as a so-called hummer drill, a vibration drill, a driver drill and the like for performing a good boring work such as generating vibration or shock.

This type electric power rotary device suffers from a problem that a twist force is intermittently generated to the fastened tool so that the tool is loosened because a force (impelling force) is generated intermittently in the axial direction or a vibration is generated intermittently in the rotational direction.

SUMMARY OF THE INVENTION

In order to overcome the above-noted defects, an object of the present invention is to provide a chuck device that is superior in durability with a simple structure.

In order to attain this and other objects, according to the present invention, there is provided a chuck device in which a plurality of claws provided at an end of a body are opened, closed and slid by the rotation of a rotary sleeve and a tool is clamped by means of the claws, wherein an annular ratchet wheel is provided on the body, an annular nut member to be engaged with the claws and to be rotated together with the rotary sleeve is fitted in the body inside of the rotary sleeve, a retainer spring member detachably retained with a tooth of the ratchet wheel is arranged outside of the ratchet wheel, the retainer spring member is arranged to rotate around the ratchet wheel in accordance with the rotation of the nut member, the retainer spring member is mounted on the nut member by convex/concave engagement means, a retainer portion keeps a condition that the ratchet wheel and the retainer spring member are retained to each other and a condition that the engagement between the ratchet wheel and the retainer spring member is released, and the retainer portion is disposed between the body and the rotary sleeve and defined by the retainer spring member and an inner surface of the rotary member.

In the chuck device according to the first aspect of the invention, according to a second aspect, the retainer portion keeps the retainer spring member in a predetermined position to thereby keep the condition that the ratchet wheel and the retainer spring member are retained to each other and the condition that the engagement between the ratchet wheel and the retainer spring member is released.

In the chuck device according to the first aspect or the second aspect of the invention, according to the third aspect, the retainer portion is convex/concave engagement means defined by the retainer spring member and the rotary sleeve.

According to a fourth aspect of the present invention, there is provided a chuck device a plurality of claws provided at an end of a body are opened, closed and slid by the rotation of a rotary sleeve and a tool is clamped by means of the claws, wherein an annular ratchet wheel is provided on the body, an annular nut member to be engaged with the claws and to be rotated together with the rotary sleeve is fitted in the body inside of the rotary sleeve, a retainer spring member detachably retained with a tooth of the ratchet wheel is arranged outside of the ratchet wheel, the retainer spring member is composed of two spring members, one of the retainer spring members is adapted to function the retention effect with the ratchet wheel, other retainer spring member keeps a position of the retainer spring member by maintaining the position of the rotary sleeve, the retainer spring members are arranged to rotate around the ratchet wheel in accordance with the rotation of the nut member, the retainer spring members are mounted on the nut member by convex/concave engagement means, a retainer portion keeps a condition that the ratchet wheel and the retainer spring member are retained to each other and a condition that the engagement between the ratchet wheel and the retainer spring member is released, and the retainer portion is disposed between the body and the rotary sleeve and defined by the retainer spring member and an inner surface of the rotary member.

In the chuck device according to a fifth aspect of the invention, the retainer spring member and the rotary sleeve are fitted with each other by concave/convex engagement to thereby keep the condition that the ratchet wheel and the retainer spring member are retained to each other and the condition that the engagement between the ratchet wheel and the retainer spring member is released.

In the chuck device according to any one of the preceding aspects, an intermediate member disposed between a tip end retainer portion of the retainer spring member and the ratchet wheel for releasing the tip end retainer portion away from the ratchet wheel is provided on the rotary sleeve.

DESCRIPTION OF THE PREFERRED EMBODIMENTS

Figure 1:
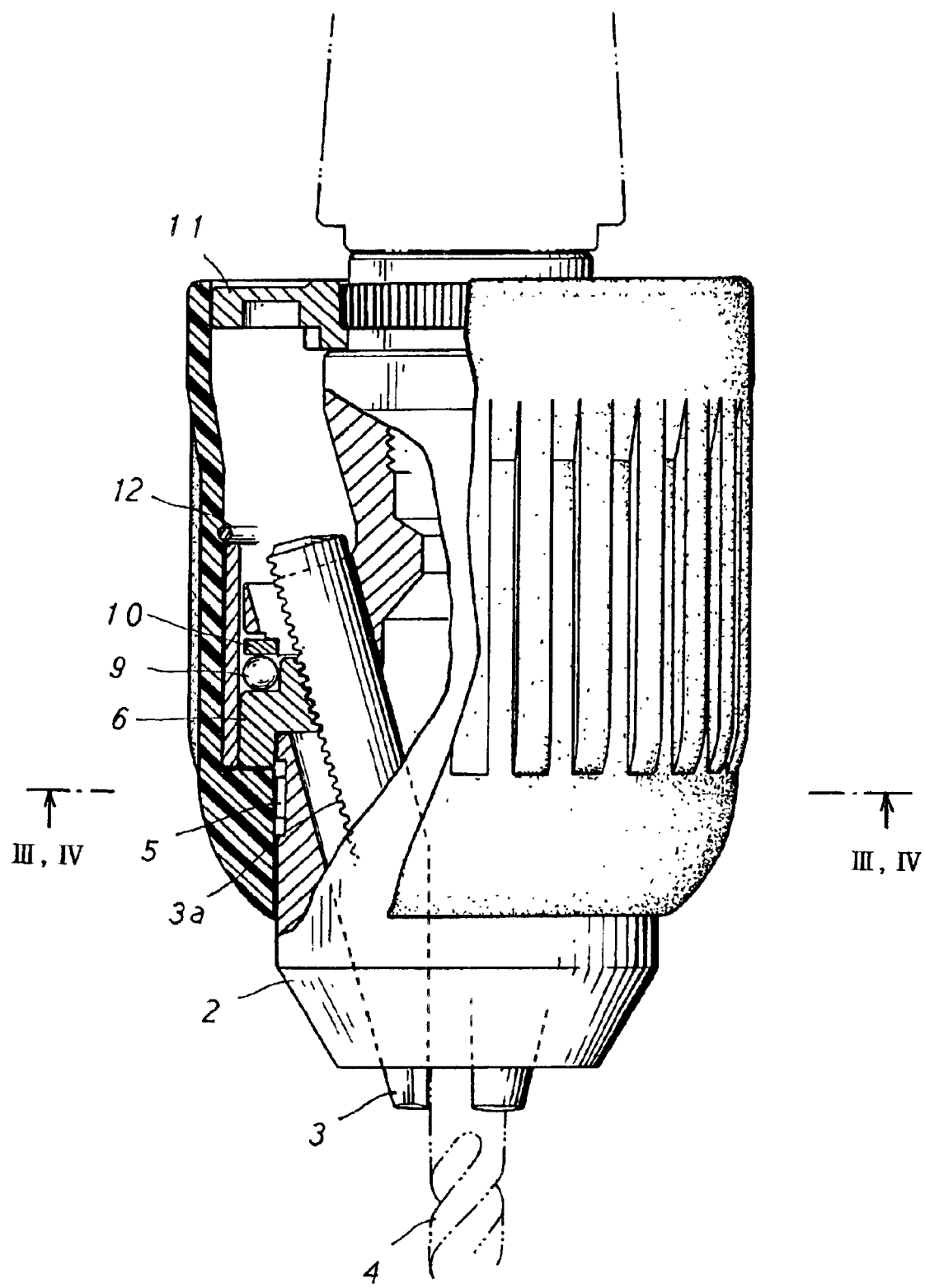
FIG. 1 is a partially fragmentary frontal view showing a device according to a first embodiment of the invention.

An embodiment of the present invention will now be described with reference to FIGS. 1 to 4.

Three claws 3 are provided obliquely in a hole 2a formed in a body 2. An annular nut member 6 that is to engage with a screw portion 3a formed on an outer surface of the claws 3 is provided and engaged with the claws 3. Incidentally, the nut member 6 is a split nut member and its shape is maintained by means of a shape retainer ring 8.

Four projections 6a, 6b, 6c and 6d on which a retainer spring member 7 is to be mounted to rotate together with the nut member 6 are provided on the nut member 6. These projections 6a, 6b, 6c and 6d are provided on the nut member 6 that is a necessary member. It is therefore unnecessary to provide any special member for providing the projecting members 6a, 6b, 6c and 6d to thereby simplify the structure according to this embodiment.

Also, annular ratchet teeth 5 that are to engage with a tip end retainer portion 7' of the retainer spring member 7 are formed on the body 2 at a front portion of the nut member 6. The tip end retainer portion 7' and the ratchet teeth 5 are engaged with each other to realize the condition that the nut member 6 is rotatable only in one direction (reverse rotation disabling condition).

Reference numeral 9 denotes a steel ball. Numeral 10 denotes a steel ball receiver. Since this steel ball receiver 10 has elasticity, a rotary sleeve 1 is prevented from rotating in the fastening direction more than necessary by the vibration or the shock torque of the electric power rotary tool.

The retainer spring member 7 is made of metal and is arranged under the condition that the retainer spring is supported to an inner surface of the rotary sleeve 1 around the ratchet teeth 5. Reference character 1b and 1e denote projections for transmitting the rotational force of the rotary sleeve 1 to the nut member 6.

Figure 2:
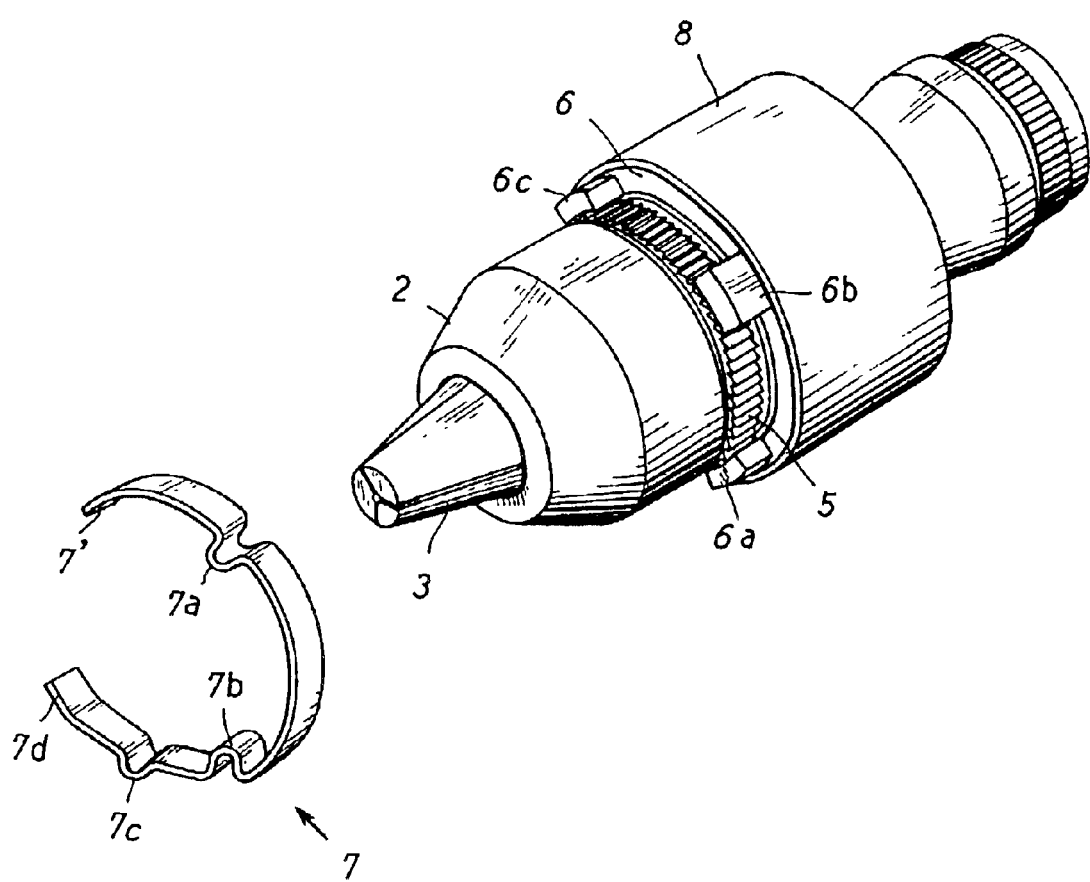
FIG. 2 is an exploded perspective view showing a primary part of the device shown in FIG. 1.
Figure 3:
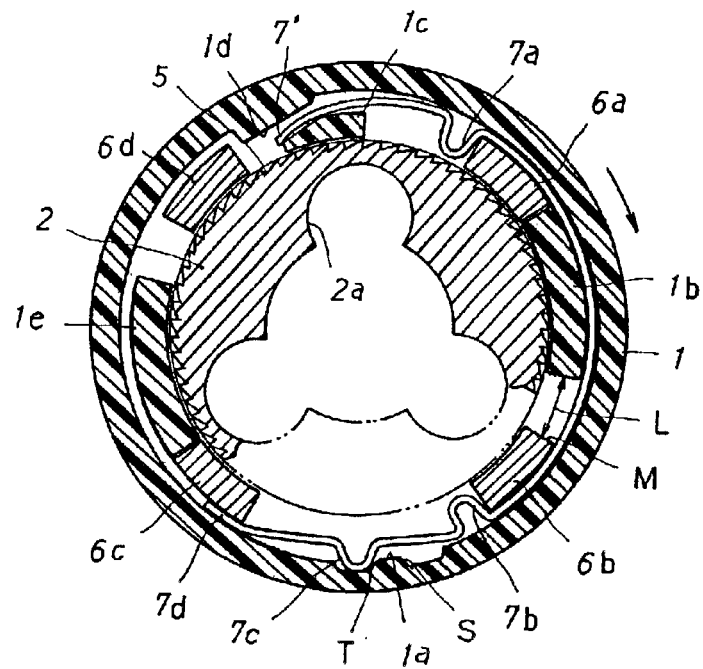
FIG. 3 is a cross-sectional view taken along the line III—III of FIG. 1 for illustrating the operation of the device according to the first embodiment.
Figure 4:
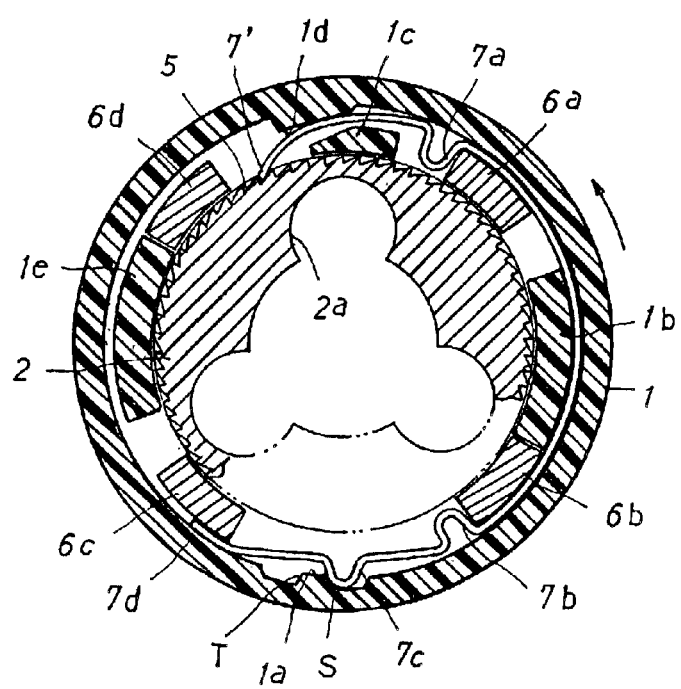
FIG. 4 is a cross-sectional view taken along the line IV—IV of FIG. 1 for illustrating the operation of the device according to the first embodiment.
Figure 5:
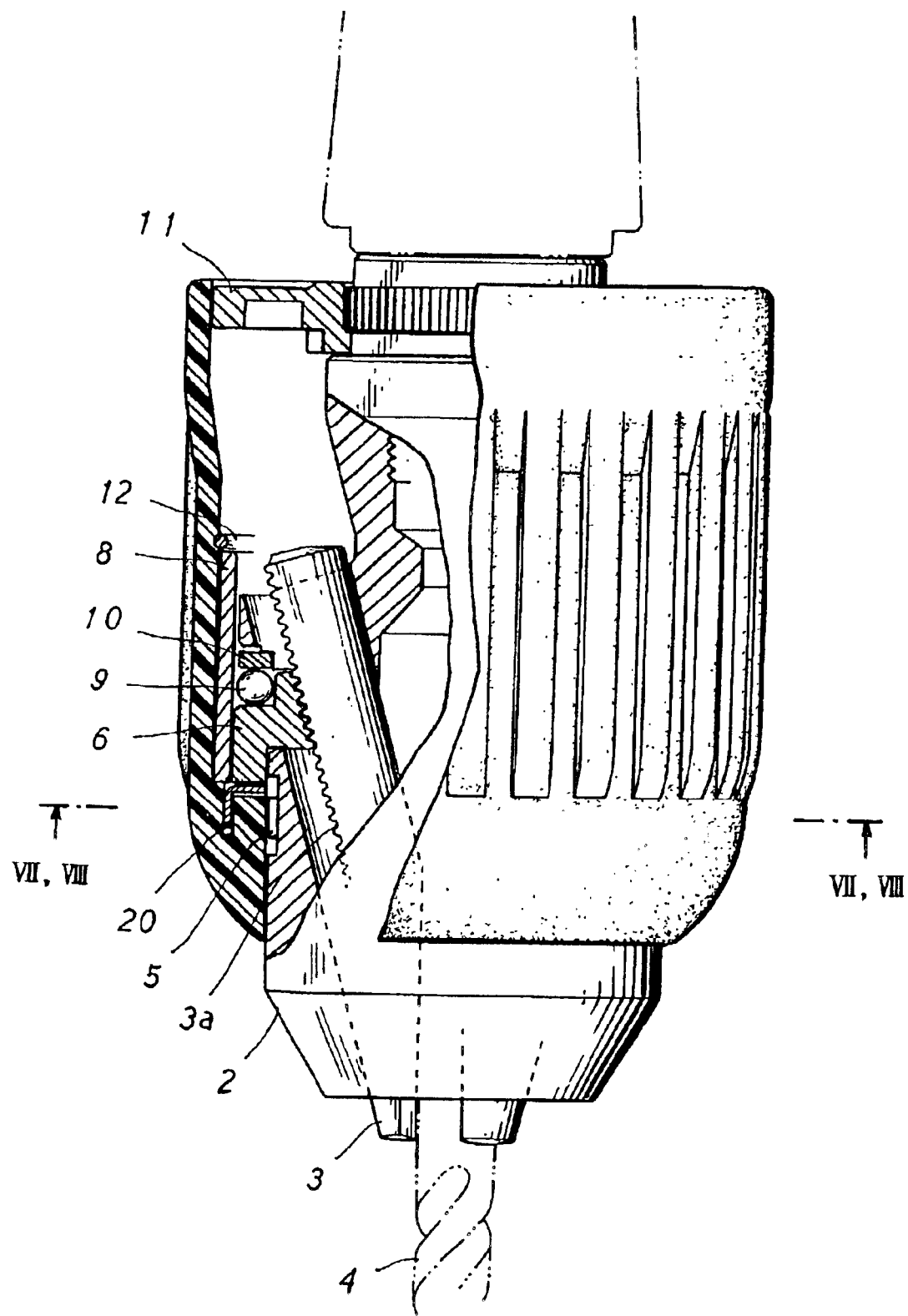
FIG. 5 is a partially fragmentary frontal view showing a device according to a second embodiment of the invention.
Figure 6:
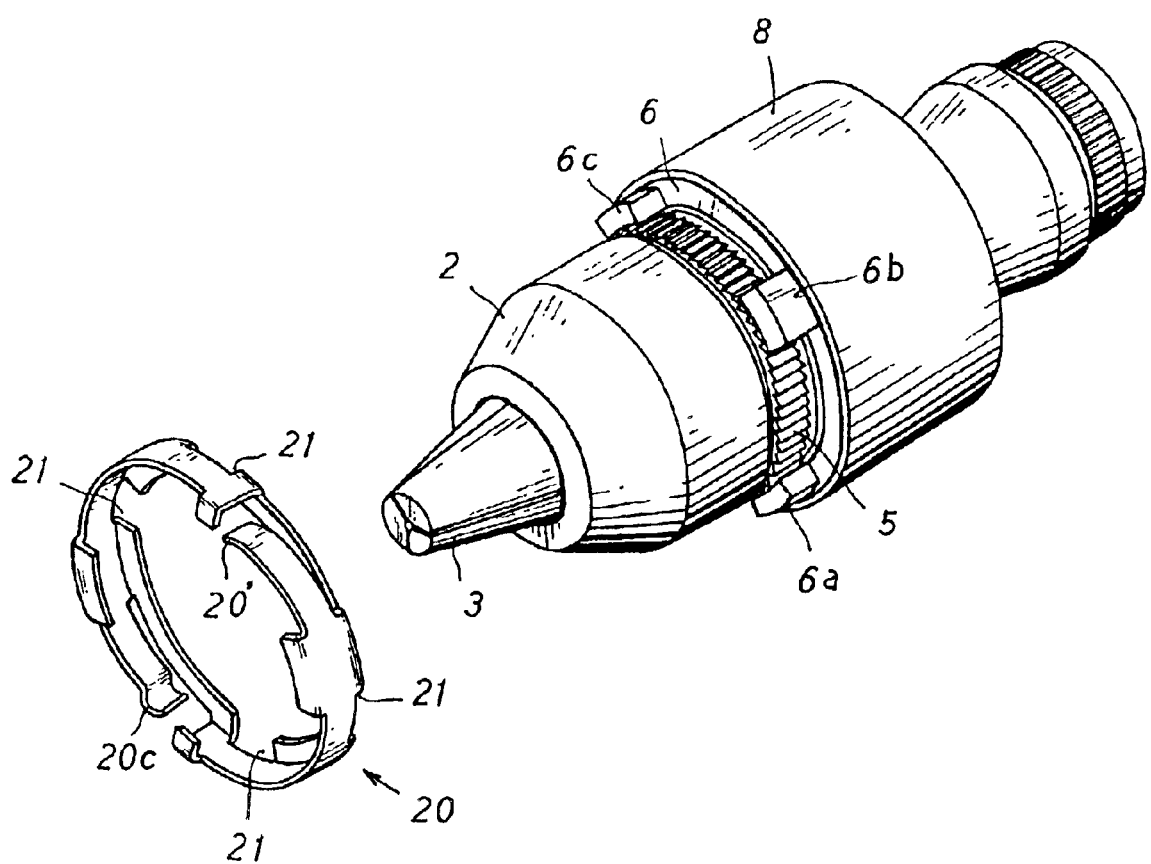
FIG. 6 is an exploded perspective view showing a primary part of the device shown in FIG. 4.
Figure 7:
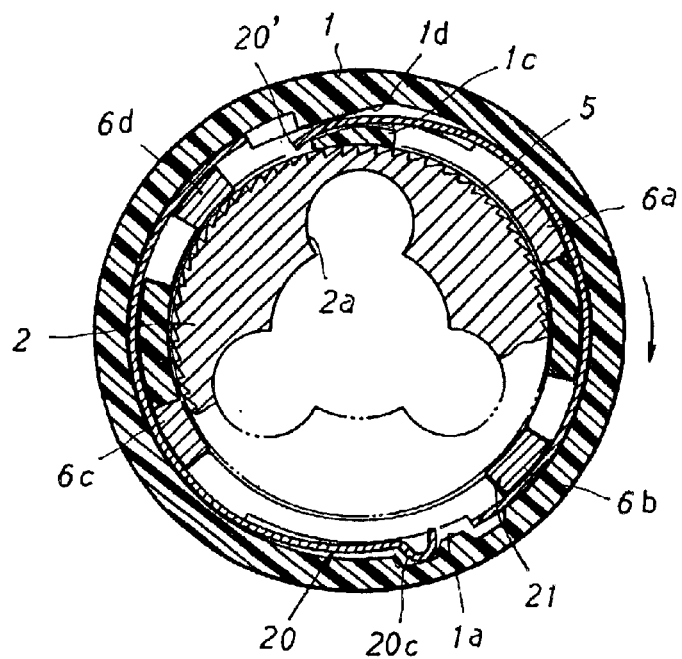
FIG. 7 is a cross-sectional view taken along the line VII—VII of FIG. 5 for illustrating the operation of the device according to the second embodiment.
Figure 8:
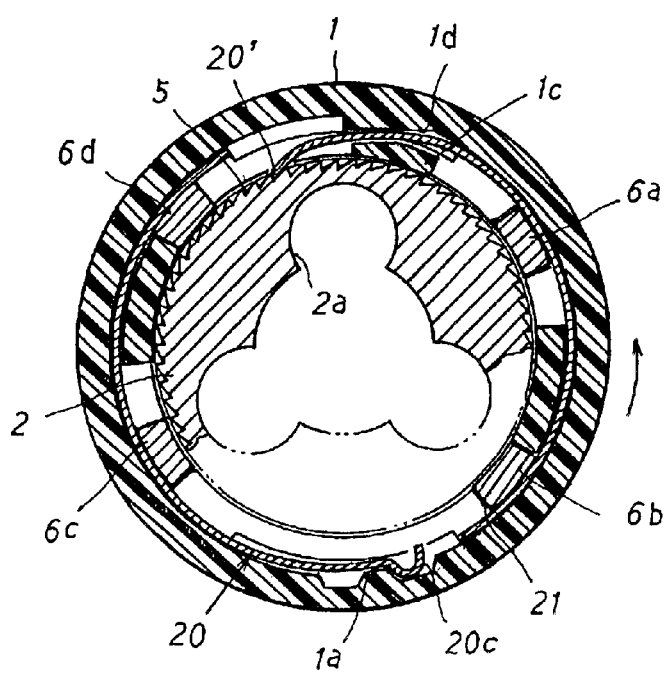
FIG. 8 is a cross-sectional view taken along the line VIII—VIII of FIG. 5 for illustrating the operation of the device according to the second embodiment.

As shown in FIGS. 2, 3 and 4, three projections 7a, 7b and 7c and the tip end retainer portion 7' to be retained at the ratchet teeth 5 are provided in the retainer spring member 7. Also, a contact portion 7d for contacting the projection 6c to exhibit the good spring force is provided at a rear end portion of the retainer spring member 7 (The opposite side of the contact portion 7d is received by the projection 6b). The retainer spring member 7 is mounted so as to rotate together with the nut member 6 by means of the projections 7a and 7b of the retainer spring member 7 and the projections 6a and 6b of the above-described nut member 6.

In this embodiment, since the retainer spring member 7, the projections 1b and 1e and the projections 6a, 6b, 6c and 6d are provided on the same circumference, it is thus possible to design a compact system.

Incidentally, how to mount the retainer spring member 7 and the nut member 6 is not limited to the above-described structure if a structure in which the two components may rotate together is taken.

An intermediate member 1c for performing the release of the engagement between the tip end retainer portion 7' of the retainer spring member 7 and the ratchet teeth 5 is provided on the inner surface of the rotary sleeve 1. The tip end retainer portion 7' is received by a tip end taper surface of this intermediate member 1c to thereby positively perform the release of the threaded engagement between the tip end retainer portion 7' and the ratchet teeth 5.

Also, a depression portion Id for depressing the tip end retainer portion 7' of the retainer spring member 7 to maintain the engagement condition between the tip end retainer portion 7' and the ratchet teeth 5 is provided on the inner surface of the rotary sleeve 1.

The rotary sleeve 1 whose tip end is to be received by the body 2 is fitted in the nut member 6. The rotary sleeve 1 is rotated together with the nut member 6. However, when a predetermined load is applied to the rotation of the nut member 6, the rotary sleeve 1 may rotate through a predetermined angle to the nut member 6.

The rotation of the rotary sleeve 1 through the predetermined angle to the nut member 6 is defined between the projection 6a and the projection 6b, more specifically, a distance L in FIG. 3. Accordingly, when the rotary sleeve 1 is rotated so that the load is applied, the projection 1a of the rotary sleeve 1 rides over the projection 7c against the spring force of the retainer spring member 7 and the end face of the projection 1b is brought into contact with the end face M of the projection 6b (the end face of the projection 1e is brought into the end face of the projection 6d in the same manner) whereby the rotary sleeve 1 and the nut member 6 are integrated together to perform the increase of the fastening.

As far as the projection 1a rides over the projection 7c of the retainer spring member 7 against the spring force, due to the provision of the projection 1a, there is no fear that the rotary sleeve 1 is rotated in the loosening direction. Accordingly, it is possible to exhibit the loosening prevention effect without fail. Incidentally, it is possible to set the loosening prevention force by the spring force of the retainer spring member 7, particularly, the spring force between the projection 7b and the contact portion 7d and the shape of the projection 1a and the projection 7c.

Furthermore, slippage preventing projections is formed on the outer surface of the rotary sleeve 1 (made of synthetic resin). Also, the rotary sleeve 1 is received at one end to the body 2 and at the other end to a receiver member 11 provided on the body 2.

Reference numeral 12 denotes a C-shaped pull-apart preventing ring for the rotary sleeve 1.

With such an arrangement, the following effect is obtained according to this embodiment.

The tool 4 is clamped by means of the claws 3. When the rotary sleeve 1 is rotated, the nut member 6 is rotated together with the rotary sleeve 1 until a predetermined load is applied to the rotary sleeve 1. Accordingly, the retainer spring member 7 is also rotated around the ratchet teeth 5.

When the rotary sleeve 1 is rotated to a predetermined position (position where the claws 3 are brought into contact with the tool 4), a predetermined load is applied to the rotary sleeve 1 (condition shown in FIG. 3). When the rotary sleeve 1 is rotated against the spring force in the direction indicated by an arrow in FIG. 3 from this condition, the rotary sleeve 1 is rotated to the nut member 6 so that the intermediate member 1c receiving the tip end retainer portion 7' of the retainer spring member 7 is moved and the depression portion 1d of the rotary sleeve 1 depresses the tip end retainer portion 7' to thereby retain the tip end retainer portion 7' to the ratchet tooth 5. Furthermore, the projection 1a of the rotary sleeve 1 rides over the projection 7c of the retainer spring member 7 (the projection 7c is positioned from the T side to the S side of FIG. 3). The projection 1b is brought into contact with the end face M of the projection 6b and in the same manner, the projection 1e is brought into contact with the projection 6d so that the rotary sleeve 1 and the nut member 6 are integrated. When the rotary sleeve is further rotated, the tip end retainer portion 7' of the retainer spring member 7 retained at the ratchet tooth 5 rides over the ratchet teeth 5 one by one by the leaf spring effect to be retained at the predetermined ratchet tooth 5. Under this condition, the reverse rotation no longer takes place due to the ratchet tooth 5. The rotational resistance of the rotary sleeve 1 is increased to complete the fastening operation as shown in FIG. 4.

Incidentally, the condition where the teeth are passed one by one means the incompletion of the fastening operation. When the fastening operation is completed, there is no ride-over of the teeth.

This fastening condition is kept by means of the projection 1*a* and the projection 7*c*.

Also, in order to release the fastening condition, the operation is performed in the opposite order. Namely, when the rotary sleeve 1 is rotated in the reverse direction, the projection 7*c* located on the S side (in the condition shown in FIG. 4) rides over the projection 1*a*. When the rotary sleeve 1 is further rotated in the direction indicated by the arrow in FIG. 4, the engagement between the tip end retainer portion 7' and the ratchet tooth 5 by the depression portion 1*d* is released. Furthermore, the intermediate member 1*c* is moved to lift up the tip end portion 7' of the retainer spring member 7. When the rotary sleeve 1 is further rotated, the fastening force of the tool 4 is loosened. This condition, i.e., the condition where the engagement between the tip end retainer portion 7' of the retainer spring member and the ratchet tooth 5 is released is also maintained by means of the projection 7*c* and the projection 1*a*.

It is thus possible to provide a chuck device that may positively prevent the loosening of the fastening of the tool 4 and that is superior in durability with a simple structure according to this embodiment.

In the first embodiment, the intermediate member 1*c* is used to prevent the tip end retainer portion 7' of the retainer spring member 7 from engaging with the ratchet tooth 5 accidentally. Accordingly, under the condition where the tip end retainer portion 7' is not received by the intermediate member 1*c*; that is, the depression portion 1*d* is not brought into contact with the tip end retainer portion 7', the end tip retainer portion 7' is separated away from the ratchet teeth 5 by the elasticity of the spring. However, it is possible to take a structure where the engagement of the tip end retainer portion 7' and the ratchet tooth 5 is forcibly released.

FIGS. 5 to 8 show a second embodiment of the present invention. This will now be described.

In the second embodiment, a retainer spring member that is different from the retainer spring member 7 according to the first embodiment is used. The overall structure of the second embodiment is the same as that of the first embodiment except for this point.

The retainer spring member 20 having the different structure will now be described.

The retainer spring member 20 according to the second embodiment is composed of a single annular spring plate and may be arranged more stably than the retainer spring member 7 of the first embodiment since the retainer spring member 20 has the annular shape.

Reference character 20' denotes a portion corresponding to the tip end retainer portion 7' of the first embodiment, character 20*c* denotes a portion corresponding to the projection 7*c* of the first embodiment, and numeral 21 denotes four cutaways corresponding to the projection 7*a* of the first embodiment and the projection 7*b* of the first embodiment. These cutaways are fitted with the projections 6*a*, 6*b*, 6*c* and 6*d* of the nut member 6. Thus, the retainer spring member 20 is arranged to the nut member 6 to be unrotatable.

Figure 9:
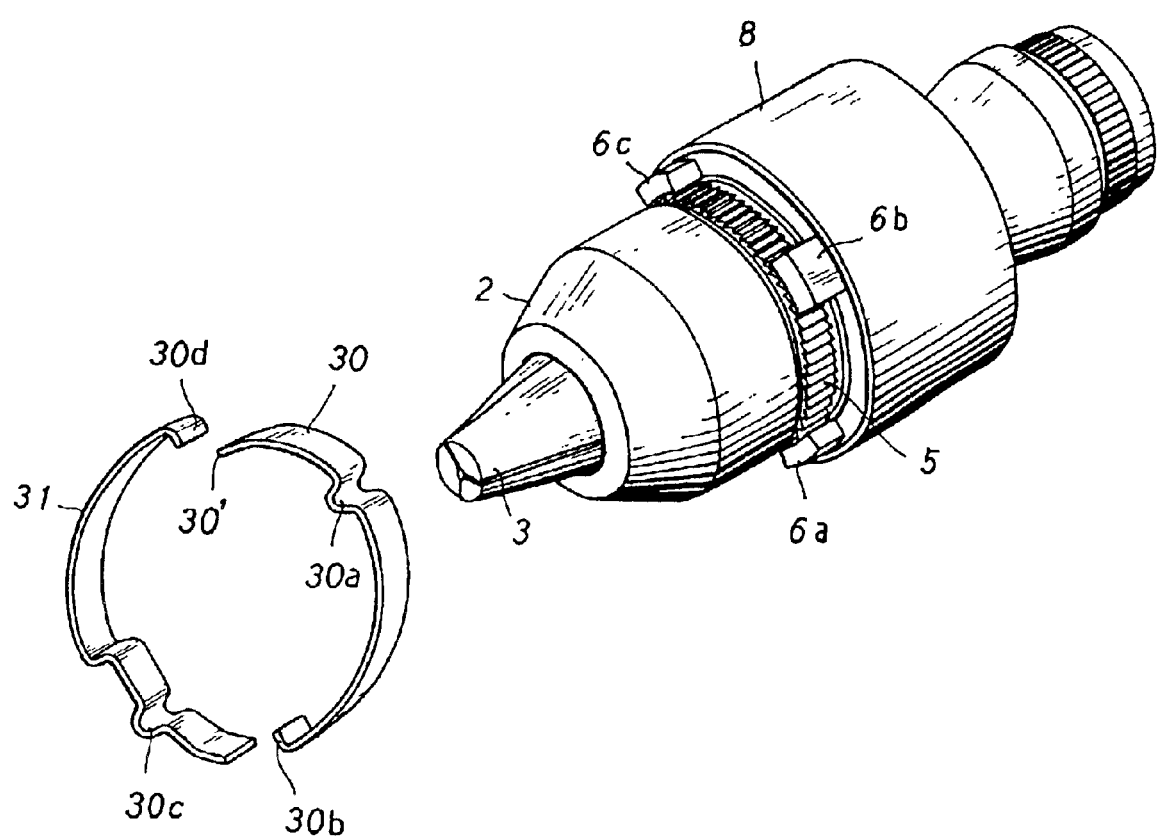
FIG. 9 is an exploded perspective view showing a primary part of a device according to a third embodiment.
Figure 10:
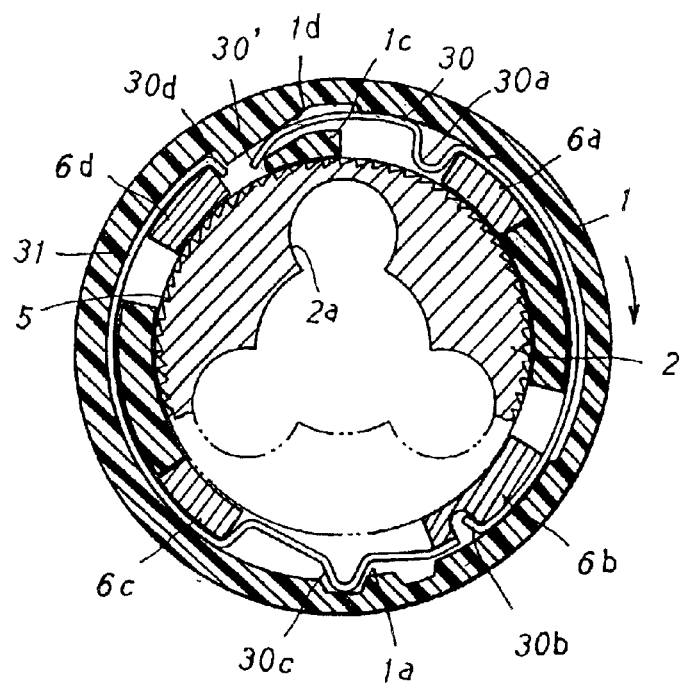
FIG. 10 is a cross-sectional view of a device according to a third embodiment corresponding to FIG. 3.
Figure 11:
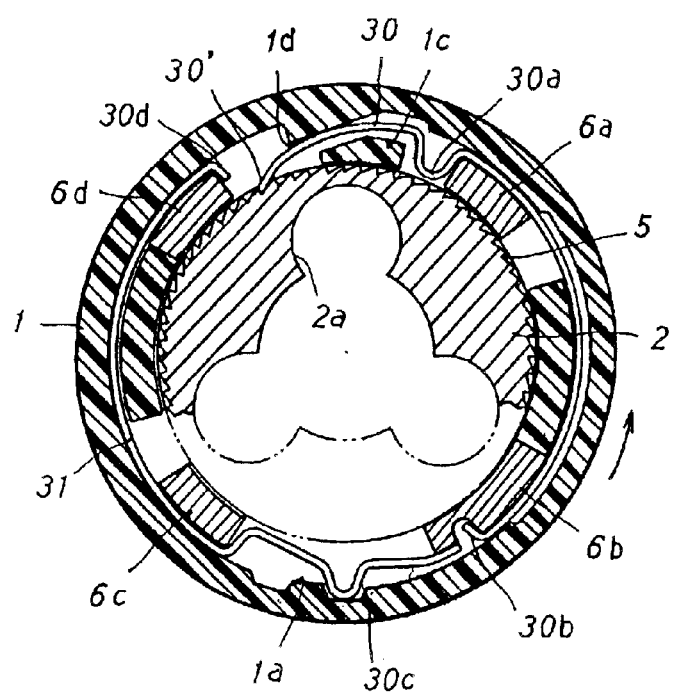
FIG. 11 is a cross-sectional view of a device according to the third embodiment corresponding to FIG. 4.

A third embodiment of the present invention will now be described with reference to FIGS. 9 to 11.

In the third embodiment, the retainer spring member 7 of the first embodiment is composed of two retainer spring members 30 and 31. One of the retainer spring members 30 functions to retain the ratchet teeth 5 and the other retainer spring member 31 functions to maintain the position of the rotary sleeve 1 to thereby retain the retainer spring member 30 in a predetermined position. Thus, according to the third embodiment, the retention function of the ratchet teeth 5 and the retainer maintenance function and the retention release function of the ratchet teeth 5 are separated to the different springs unlike the first and second embodiments. Incidentally, since the retainer spring member 7 is composed of the two retainer spring members 30 and 31, it is possible to suitably select the material and thickness of each retainer spring member 30, 31 to thereby make it possible to set the spring strength of each spring as desired. Accordingly, the structure may cope with many factors in various fields of use and purposes.

Reference character 30' denotes a portion corresponding to the tip end retainer portion 7' of the first embodiment, character 30*a* denotes a retainer portion corresponding to the projection 7*a* of the first embodiment, character 30*b* denotes a retainer portion corresponding the projection 7*b* of the first embodiment, character 30*c* denotes a portion corresponding to the projection 7*c* of the first embodiment 7*c* and character 30*d* denotes a retainer portion to be fitted with the projection 6*d*.

Figure 12:
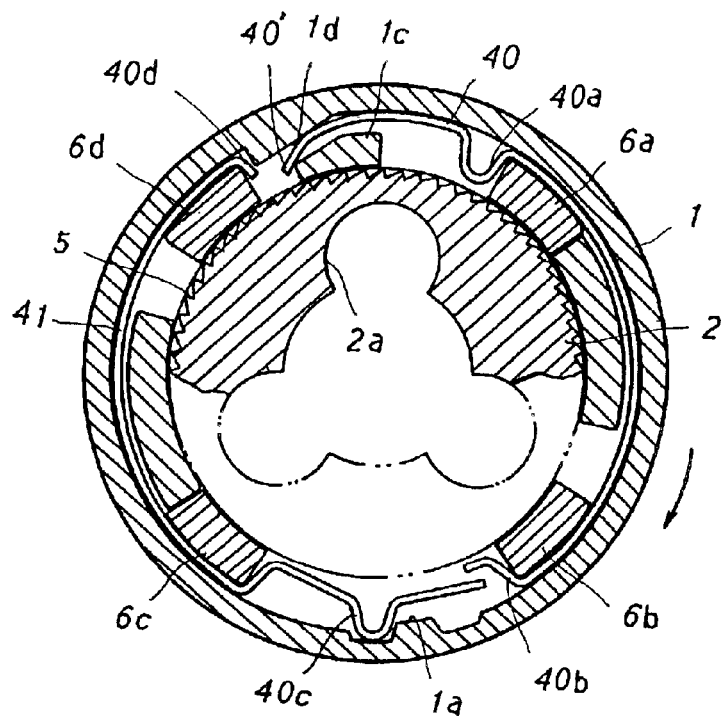
FIG. 12 is a cross-sectional view of a device according to a fourth embodiment corresponding to FIG. 3.
Figure 13:
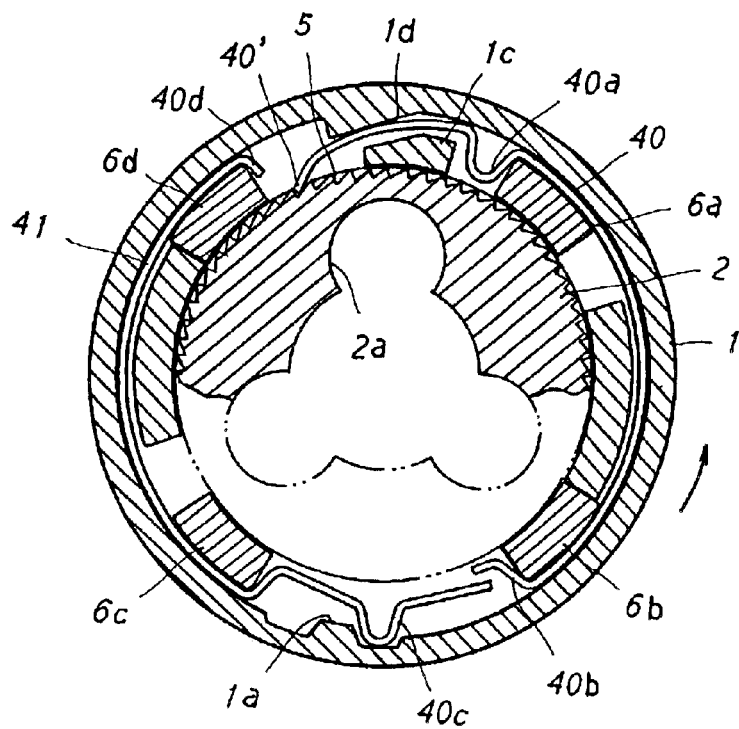
FIG. 13 is a cross-sectional view of a device according to the fourth embodiment corresponding to FIG. 4.

FIGS. 12 and 13 show a fourth embodiment of the present invention which will now be described.

In the fourth embodiment, the retainer spring member 7 of the first embodiment is composed of two retainer springs 40 and 41 in the same manner as in the third embodiment and is different from the third embodiment only in that the condition of the end portions of the two retainer spring members 40 and 41. The other structure is the same as that of the third embodiment.

Reference character 40' denotes a portion corresponding to the tip end retainer portion 7' of the first embodiment, character 40*a* denotes a portion corresponding to the projection 7*a* of the first embodiment, character 40*b* denotes a retainer portion corresponding the projection 7*b* of the first embodiment, character 40*c* denotes a portion corresponding to the projection 7*c* of the first embodiment and character 40*d* denotes a retainer portion to be fitted with the projection 6*d*.

What is claimed is:

1. A chuck device in which a plurality of claws provided at an end of a body are opened, closed and slid by the rotation of a rotary sleeve and a tool is clamped by means of the claws, wherein an annular ratchet wheel is provided on the body, an annular nut member to be engaged with the claws and to be rotated together with the rotary sleeve is fitted in the body inside of the rotary sleeve, wherein said annular nut member has projections, a retainer spring member detachably retained with a tooth of the ratchet wheel is arranged outside of the ratchet wheel, the retainer spring member is arranged to rotate around the ratchet wheel in accordance with the rotation of the nut member, the retainer spring member is mounted on the nut member by convex/concave engagement means, a retainer portion keeps a condition that the ratchet wheel and the retainer spring member are retained to each other and a condition that the engagement between the ratchet wheel and the retainer spring member is released, and the retainer portion is disposed between the body and the rotary sleeve and defined by the retainer spring member and an inner surface of the rotary member, and wherein said projections of said annular nut member are disposed between said retainer spring member and said annular rachet wheel.

2. The chuck device according to claim 1, wherein the retainer portion keeps the retainer spring member in a predetermined position to thereby keep the condition that the ratchet wheel and the retainer spring member are retained to each other and the condition that the engagement between the ratchet wheel and the retainer spring member is released.

3. The chuck device according to claim 1 or 2, wherein the retainer portion is convex/concave engagement means defined by the retainer spring member and the rotary sleeve.

4. A chuck device in which a plurality of claws provided at an end of a body are opened, closed and slid by the rotation of a rotary sleeve and a tool is clamped by means of the claws, wherein an annular ratchet wheel is provided on the body, an annular nut member to be engaged with the claws and to be rotated together with the rotary sleeve is fitted in the body inside of the rotary sleeve, wherein the annular nut member has projections, a retainer spring member detachably retained with a tooth of the ratchet wheel is arranged outside of the ratchet wheel, the retainer spring member is composed of two spring members, one of the retainer spring members (30) is adapted to function the retention effect with the ratchet wheel, and the other retainer spring member (31) keeps a position of the one of the retainer spring members (30) by maintaining the position of the rotary sleeve, the retainer spring members (30, 31) are arranged to rotate around the ratchet wheel in accordance with the rotation of the nut member, the retainer spring members (30, 31) are mounted on the nut member by convex/concave engagement means, a retainer portion keeps a condition that the ratchet wheel and the one of the retainer spring members (30) are retained to each other and a condition that the engagement between the ratchet wheel and the one of the retainer spring members (30) is released, and the retainer portion is disposed between the body and the rotary sleeve and defined by the other retainer spring member (31) and an inner surface of the rotary member, and wherein said projections of said annular nut member are disposed between said one of the retainer spring member (30) and said annular rachet wheel, and between said other retainer spring member (31) and said annular ratchet wheel, respectively.

5. The chuck device according to claim 4, wherein the one of the retainer spring members (30) and the rotary sleeve are fitted with each other by concave/convex engagement to thereby keep the condition that the ratchet wheel and the one of the retainer spring members (30) are retained to each other and the condition that the engagement between the ratchet wheel and the one of the retainer spring members (30) is released.

6. The chuck device according to claim 1 or 2, wherein an intermediate member disposed between a tip end retainer portion of the retainer spring member and the ratchet wheel for releasing the tip end retainer portion away from the ratchet wheel is provided on the rotary sleeve.

7. The chuck device according to claim 3, wherein an intermediate member disposed between a tip end retainer portion of the retainer spring member and the ratchet wheel for releasing the tip end retainer portion away from the ratchet wheel is provided on the rotary sleeve.

8. The chuck device according to claim 4 or 5, wherein an intermediate member disposed between a tip end retainer portion of the one of the retainer spring members (30) and the ratchet wheel for releasing the tip end retainer portion away from the ratchet wheel is provided on the rotary sleeve.

* * * * *